United States Patent

Mohan et al.

[15] 3,663,803

[45] May 16, 1972

[54] PITCH MATCHING DETECTING AND COUNTING SYSTEM

[72] Inventors: William L. Mohan; Samuel P. Willits, both of Barrington, Ill.

[73] Assignee: Spartanics, Ltd., Palatine, Ill.

[22] Filed: June 22, 1970

[21] Appl. No.: 47,962

Related U.S. Application Data

[63] Continuation-in-part of Ser. No. 780,367, Dec. 2, 1968, Pat. No. 3,581,067.

[52] U.S. Cl.......................235/92 V, 235/92 R, 235/61.11 E, 250/219 D, 340/146.3 A

[51] Int. Cl.......................................................G06m 1/272

[58] Field of Search...............235/92 V, 61.11 E; 250/219 D; 340/146.3 A, 146.3 Z

[56] References Cited

UNITED STATES PATENTS

| | | | |
|---|---|---|---|
| 3,035,380 | 5/1962 | Leavens | 235/61.12 |
| 3,470,357 | 9/1969 | Ritzerfeld | 340/146.3 Z |
| 3,437,793 | 4/1969 | Van Berkel | 235/61.11 E |
| 3,581,067 | 5/1971 | Willits | 235/92 V |

*Primary Examiner*—Maynard R. Wilbur
*Assistant Examiner*—Robert F. Gnuse
*Attorney*—Jacque L. Meister

[57] ABSTRACT

An apparatus for sensing and automatically decoding data printed or otherwise marked on objects moving past the apparatus. The coded data is in the form of one or more data channels each comprising a plurality of substantially uniform width stripes of alternating contrast characteristics. Each channel has a sensor array associated with it. Sensing of the coded data present in each channel is accomplished by matching sensor width to that of the coded data stripes and by utilizing sensor arrays that accomplish spatial filtering and signal reinforcement of the data present on each coded channel. Logic circuits sequentially determine the binary or numerical value of elements of coded data as they pass before the apparatus.

11 Claims, 16 Drawing Figures

WILLIAM L. MOHAN
SAMUEL P. WILLITS
INVENTOR.

BY Jacque L. Meister
ATTY.

WILLIAM L. MOHAN
SAMUEL P. WILLITS
INVENTOR.

BY Jacque L. Meister
ATTY.

WILLIAM L. MOHAN
SAMUEL P. WILLITS
INVENTOR.

BY Jacques L. Meister
ATTY.

WILLIAM L. MOHAN
SAMUEL P. WILLITS
INVENTOR.
BY Jacque L. Meister
ATTY.

WILLIAM L. McHAN
SAMUEL P. WILLITS
INVENTOR.
BY Jacque L. Meister
ATTY.

WILLIAM L. MOHAN
SAMUEL P. WILLITS
INVENTOR.

BY Jacques L. Meister
ATTY.

WILLIAM L. MOHAN
SAMUEL P. WILLITS
INVENTOR.

BY Jacque L. Meister
ATTY.

PITCH MATCHING DETECTING AND COUNTING SYSTEM

CROSS REFERENCES TO RELATED APPLICATION

This application is a continuation-in-part of the application of WILLIAM L. MOHAN and SAMUEL P. WILLITS, Ser. No. 780,367, filed Dec. 2, 1968, titled, PITCH MATCHING DETECTING AND COUNTING SYSTEM now U.S. Pat. No. 3,581,067, issued May 25, 1971.

BACKGROUND OF THE INVENTION

The field of the invention is generally related to article counting and more particularly to improvements in sensing and indicating apparatus used to decode data which enables more accurate readout and count of the data.

In today's automated society there are many needs for remotely and automatically decoding data printed or otherwise marked on items. This decoded data can then be used for automated routing and sorting of the items. Among the many examples of such systems presently in use are those used for sorting freight cars, cartons in warehouses and on production lines, and for checks and other notes. These systems vary widely in the coding used and in their encoding and decoding methods. However, to reduce the errors that occur in any system when there is a poor signal-to-noise ratio, all methods and all codings generally attempt to present high contrast targets to their sensors. Among the schemes used to achieve this desirable high contrast, are the use of retro-reflective surfaces on plain non-reflecting backgrounds, magnetic strips on a generally non-magnetic background, etc..

Regardless of the code and of the methods and materials used for encoding and decoding, all of the prior art systems are or can be degraded in hostile environments which end to obscure the coded data. Once so degraded it is necessary that the signal data be enhanced so that ambiguities are removed and decoding made more accurate. We have discovered that this signal enhancement can be readily accomplished by the use of specialized spatial filtering techniques.

Spatial filtering is in itself an old and well known art, often used for detecting small or low contrast targets against varied or gradient type backgrounds. The majority of such systems employ an objective lens, a reticle and a detector. The reticle is used to chop the image to produce a light intensity modulation on the detector. This modulation is the product of the two-dimensional transform or space frequency of the object, the lens, and the reticle — all modulated at a time frequency determined by the separate space - time function of the reticle. If the object plane contains a small target relative to the spatial separations of the reticle, the modulated signal will contain a space frequency reinforcement component whereas the noise component of space frequency reinforcement will tend to cancel out.

At least one disclosure of the prior art, that of A. Lanes et al., in U.S. Pat. No. 3,445,634, contemplates or at least achieves image reinforcement of coded data through the use of conventional spatial filtering techniques combined however, with a particular encoding method. Thus, in the Lanes disclosure spatial filtering is used to implement a binary logic coding system where particular reticles detect either the alignment or lack of alignment of data elements coded in the same manner as the reticle. Thus the reinforcement attributes of spatial filtering are used solely for go or no-go signal discrimination using optical auto-correlation and are not truly used to enhance the signal-to-noise ratio of the coded data. While this type of system is operative, it does not fully utilize either the signal enhancement or noise rejection potential present when spatial filtering methods are used.

SUMMARY OF THE INVENTION

It is accordingly a principal object of the invention to more fully utilize the image enhancement - noise rejection potential of spatial filtering in a signal decoding apparatus than prior art devices have heretofore achieved. This object is achieved by converting the coded data into "pitch-match coded data and the decoder into a "pitch-match" decoding array. This conversion is accomplished if the coding of the target is composed of alternate bright and dark stripes of essentially equal width. The pitch of the target stripes is optically matched to the pitch of one or more pairs of sensors comprising the sensor array. The optical method of pitch matching can be by any suitable method but those methods disclosed in the aforementioned Mohan et al. application, are presently preferred.

When substantially complete pitch matching has been achieved between the sensor array and the coded target data and there is relative motion therebetween, the output signal of the sensor array will form an alternating voltage pattern indicative of target brightness changes modified only by image velocity of the coded target and its distance from the sensor array. If the sensors are connected in push-pull, brightness fluctuations in the coded data are emphasized and noise data attenuated. Further, if more than one pair of sensors are employed in the sensor array the data generated from each line pair will have the same time distribution for the time period when the total sensor array and target are aligned with respect to each other. The desired signals will thus be reinforced by adding the data from separate line pairs. This phase coherency between line pairs and concentration of reinforced data provided a superior method of stripping signal data from background noise in decoding apparatus.

DESCRIPTION OF THE PREFERRED EMBODIMENTS

Figure 1:
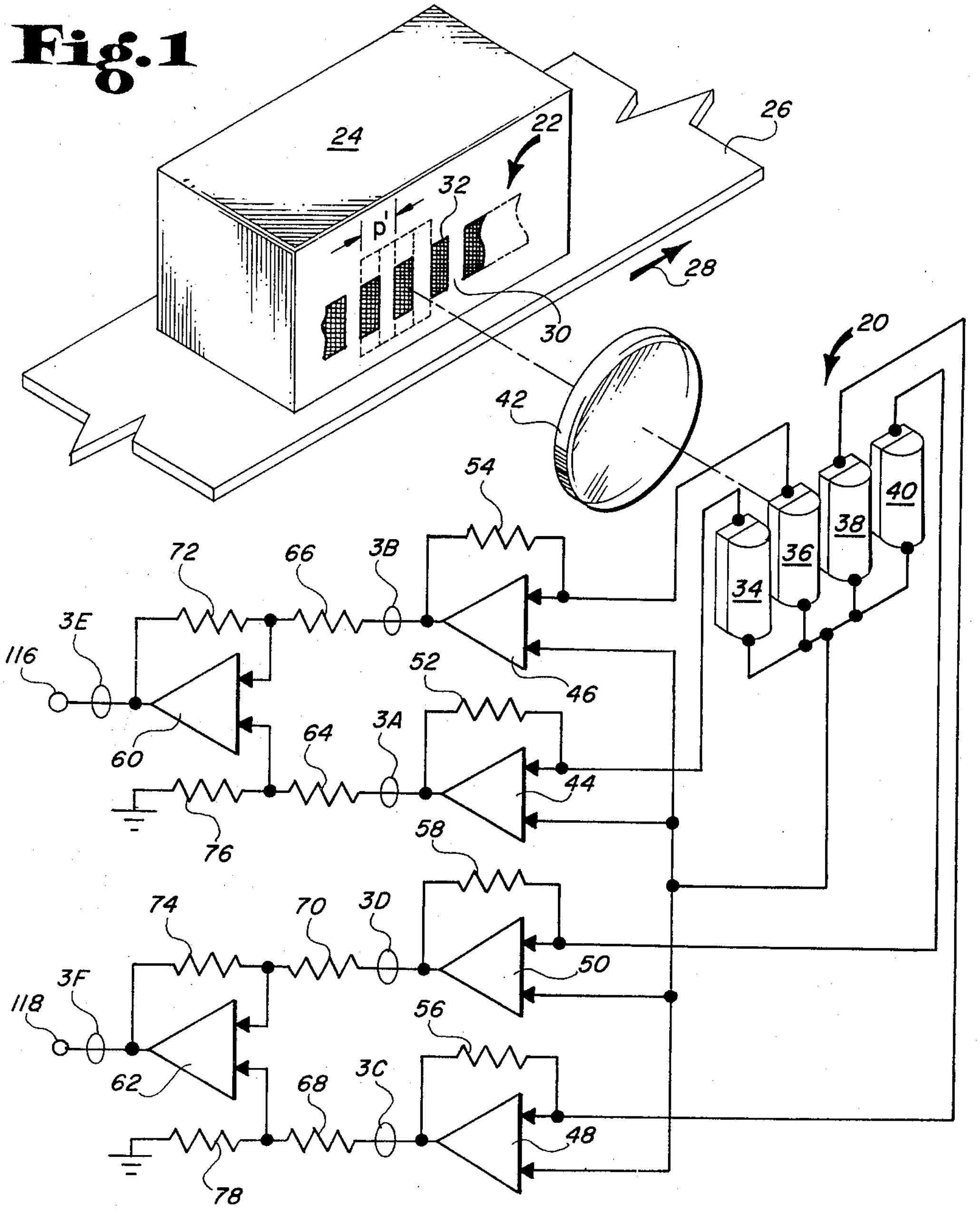
FIG. 1 is a mechanical - electrical schematic illustrating the relationship of a sensor array to a pitch match coded panel and the interconnection of the individual sensors of the array.

FIG. 1 illustrates in schematic form the arrangement and connections of a representative sensor array 20 with respect to a binary coded panel 22 on a package 24 moving past the array on a conveyor 26 in the direction of arrow 28. The coded panel 22 is shown in fragmentary form only to facilitate a larger drawing scale and is shown in more complete detail in FIG. 2. As shown in both FIGS. 1 and 2, the coded panel comprises a plurality of light and dark stripes 30 and 32 whose widths are essentially alike. Utilizing techniques such as described in the aforementioned Mohan application, the pitch $p$ of a pair of stripes 30–32 is matched to the image $p'$ of a pair of sensors 34–36 of sensor array 20. In the FIG. 1 embodiment the achievement of a reasonably close pitch match is accomplished by optical means schematically shown as objective lens 42. The various aspects of achieving a pitch-match as well as the effects of a mis-match, are all described in detail in the referenced Mohan application and are not covered in detail herein except for gross mismatch which is discussed in conjunction with FIGS. 5–8.

In FIG. 1 the sensor array 20 consists of four individual sensors 34, 36, 38 and 40, the image of each being equal in width to that of a light or dark stripe in the coded panel. Sensors 34 and 36 are connected to constitute a first line-pair and sensors 38 and 40 to constitute a second line pair. The outputs of each sensor are applied to low drift operational amplifiers 44, 46, 48, and 50, each with its respective feed back resistor 52, 54, 56 and 58. These amplifiers preserve the waveform present at their inputs while raising the potential thereof. The output of the four operational amplifiers is coupled into differential amplifiers 60 and 62 through summing resistors 64, 66, 68 and 70. Resistors 72 and 74 provide feedback paths around their respective amplifiers 60 and 62, resistors 76 and 78 to ground advantageously being of the same value as resistors 72 and 74 respectively, to enable best common mode rejection.

Figures 3, 4, 5:
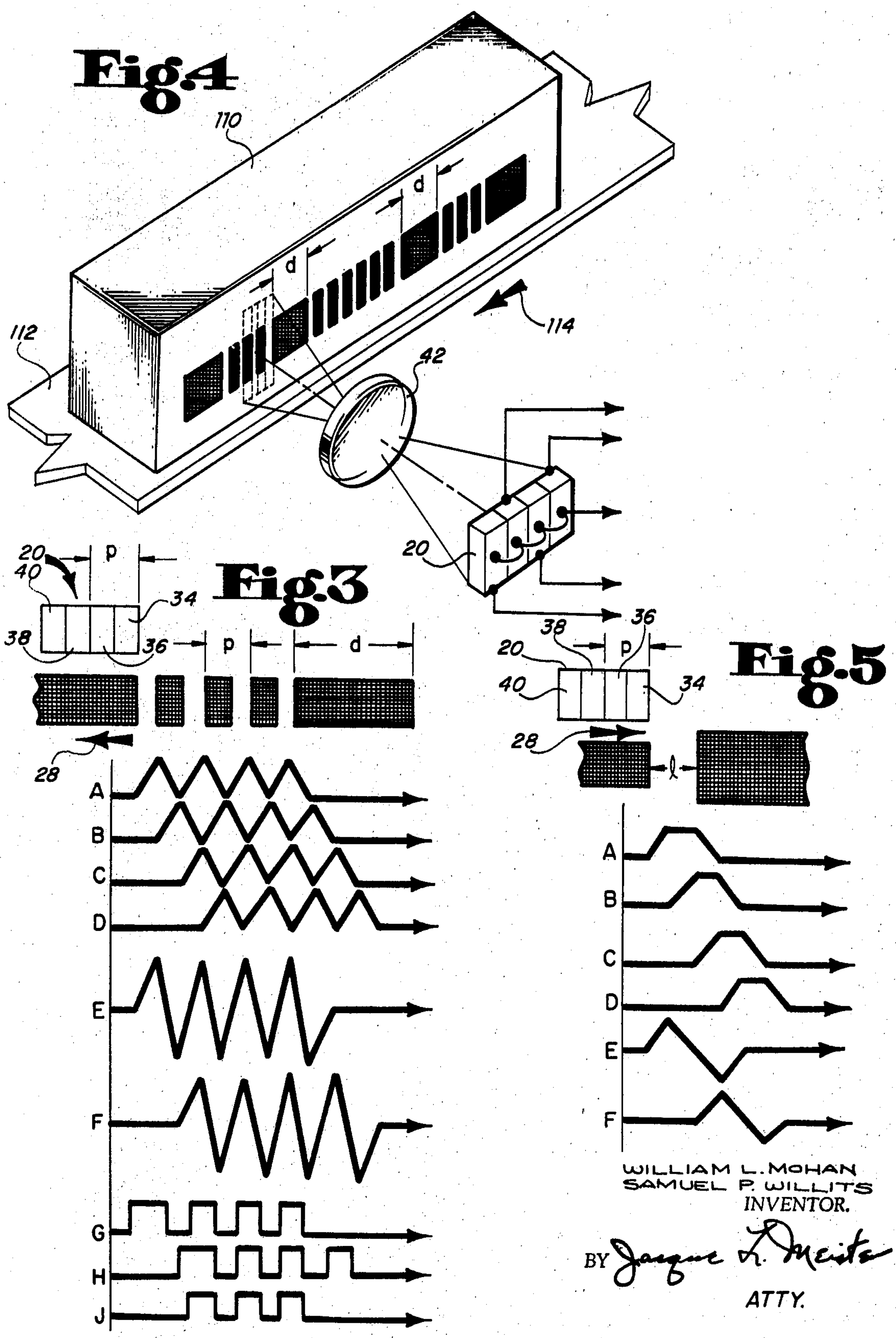
FIG. 3 illustrates waveforms present in various parts of FIGS. 1 and 13 with relative motion between the sensor array and coded data.
FIG. 4 is similar to FIG. 1 and further illustrates the relationships present for one form of binary pitch match coding.
FIGS. 5–8 illustrate the noise rejection capability of the system when the sensor array and coded data are not pitch matched.

The output signals from the individual sensors 34, 36, 38 and 40 as they traverse the alternate light and dark stripes of the coded panel are shown in FIG. 3 as waveforms A, B, C, and D, respectively. The output of line-pair 34–36 from amplifier 60 is shown as waveform E and that from line-pair 38–40, from amplifier 62, is shown as waveform F. As can be seen from the waveforms of FIG. 3 and 3E and 3F particularly, as the coded panel 22 moves past the sensor array 20 in the direction of arrow 28, the output waveform from each line-pair is indicative of the brightness changes in the coded panel and has a modulation at a time frequency depending upon the separate space position of the sensor array and the image velocity of the coded panel.

Since the image sizes of the sensor array and the stripes of the coded panel are matched in size, each line pair element of the array will generate a signal for each line pair of the coded panel and produce data whose frequency is dependent upon the relative velocity between the array and panel. Further, since both the absolute size of the pitch of the coded panel and this relative velocity is known, the center of the resultant frequency is also known and it is possible to design a notch filter to further attenuate noise in the signal output. Of course, the signal data output from the first line-pair sensor array has the same time distribution as that for the second line-pair array during the time the image of the total sensor array and stripes in the coded panel are coincident. Thus, the desired signals will also be reinforced by adding the signal data from separate sensor line-pairs and the frequency concentration of reinforced data results in signal outputs highly amenable to attenuation of background noise and reinforcement of useful signals.

Figure 2:
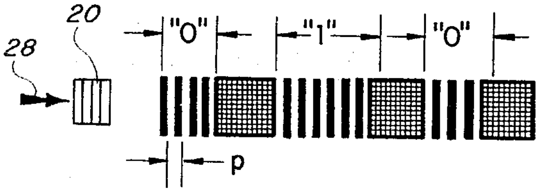
FIG. 2 illustrates binary data in pitch match coded form.

As shown in the FIG. 2 representation of a preferred binary coded panel, the logic value "0" is represented by a four cycle per bit element and the logic value "1" is represented by a seven cycle per bit element. If, as shown in FIG. 3, the sensor array 20 traverses a binary logic "0", four complete cycles are generated, resulting in the output signals 3E and 3F of the two sensor line pairs comprising the array. Of these four complete cycles in signal wavetrains 3E and 3F, three are essentially mutually coincident. As can be seen, for the binary logic "1" of FIG. 2, sensor array 20 will generate seven complete cycles in the output signal from each sensor line-pair and of this number, six would be essentially coincident and in phase.

The two line-pair sensor array of FIG. 1 is comprised of four sensor elements. In usual practice, these elements would be formed upon a common substrate separated by a small non-photoresponsive space. To provide enhanced signal amplitude and an averaging effect, it has been found that the length to width ratio of each sensor is preferably greater than 3:1.

In the majority of embodiments constructed to date utilizing photoresponsive elements, silicon photo-voltaic cells have been employed. This particular cell is preferred since it can be made small in size and has a relatively low impedance which matches that of transistorized signal processing circuits. Also, since optical elements are relatively common and inexpensive and permit optical pitch matching techniques, photo-responsive systems are presently preferred over systems utilizing other forms of electro-magnetic energy. Obviously, however, other types of cells operating with other forms of energy or radiation may be employed.

FIG. 4 is similar to FIG. 1 but additional pitch-match binary coded data is shown on the package 110 being carried by conveyor 112 in the direction of arrow 114 past sensor array 20. The "0" bit consisting of four cycles is separated from the "1" bit consisting of seven cycles by the blank area "$d$". As shown in FIG. 3, this dimension is equivalent to $(n+1)(p'/2)$ or $(n+2)(p'/2)$ where $n$ is the number of individual sensors in the array and $(p'/2)$ is the width of the image of a single sensor element. As can be seen from an inspection of FIG. 3, if $d=(n+1)(p'/2)$, the data groups in either waveforms E or F will be separated from preceding and following groups by one-half cycle. If $d=(n+2)(p'/2)$, the data groups will be separated by one complete cycle. Depending only upon the form the associated system logic circuitry takes, d can be allowed to vary anywhere between $(n)(p'/2)$ and $(n+\infty)(p'/2)$.

FIGS. 5–8 illustrate waveform outputs from both the individual sensors and the two line-pairs of array 20 for various amounts of mismatch between the apparent pitch $p'$ of a sensor line-pair and a pair of stripes in a coded target panel. As will be apparent from the figures and the discussion which follows, these mismatches result in non-coincident output signals out of phase with respect to each other. The waveforms A through F in each of these figures are those which would appear in the circuitry of FIG. 1 at the points labeled 3A through 3F, respectively, if the line-pair match were to be as shown in the respective figures.

FIG. 5 illustrates the waveform outputs of a sensor array 20 should it traverse a single bright area in an otherwise dark field. Arbitrarily, the bright area of width "$l$" is wider than $p/2$ and less than $p$ wide. As can be seen from waveforms E and F representing the two different line-pairs' output signals, a single cycle of data is generated in each line-pair and the coincident data is one-half cycle in duration and in phase opposition.

Figures 6, 7:
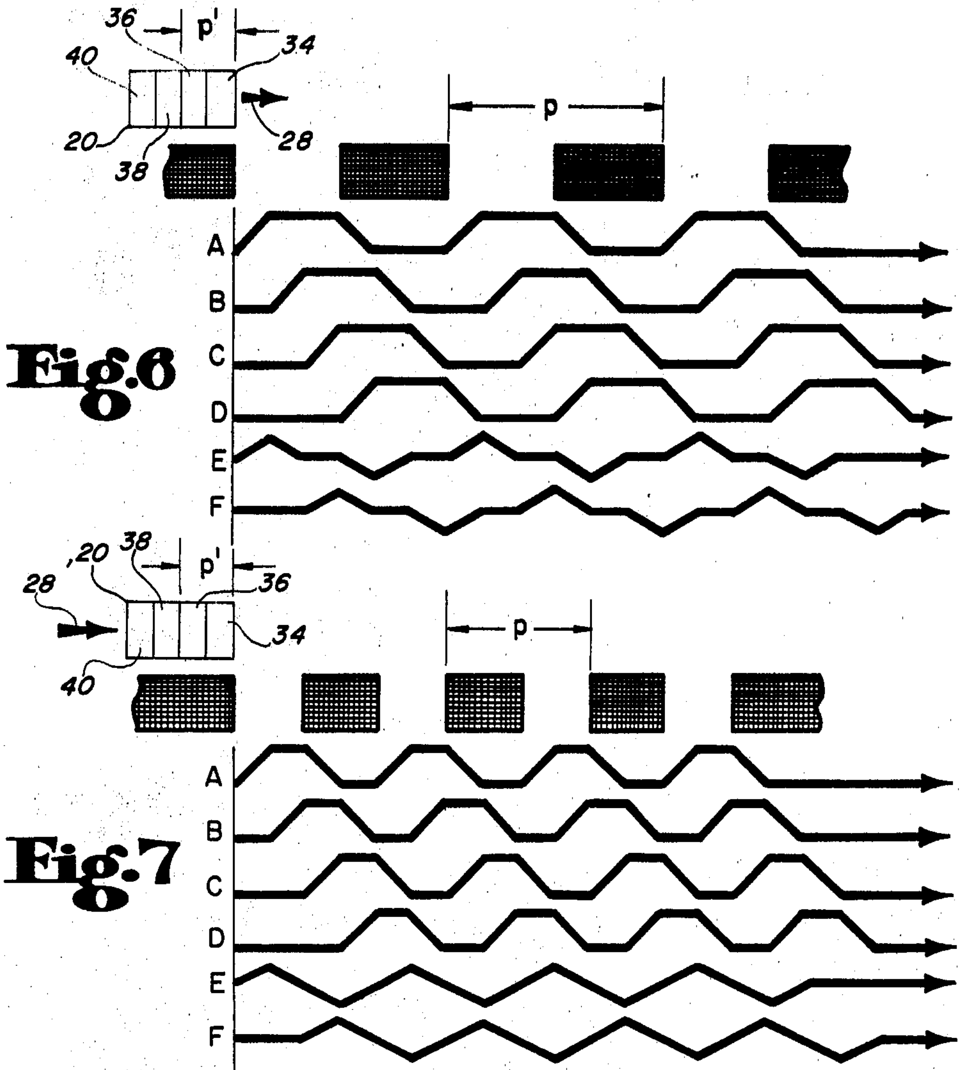

FIG. 6 shows data generated by the array when its pitch $p'$ is badly undermatched with respect to the pitch of the panel, $p$. In this example the ratio of $p:p'=3$. As can be seen from an inspection of the waveforms, and particularly waveforms 3E and 3F, all coincident data is in phase opposition.

Figure 8:
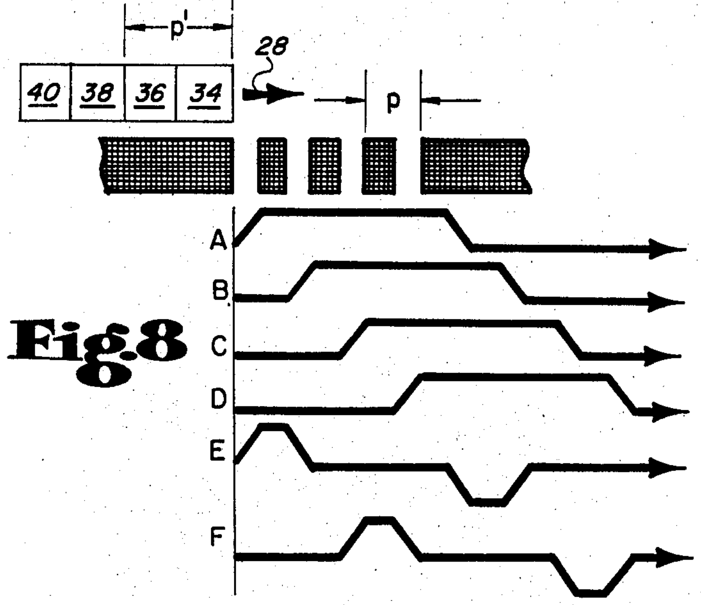

FIG. 7 illustrates the resultant signal waveforms when the line-pair mismatch ratio $p:p'=2$. As with the signals in FIGS. 5 and 6, the phase of each line pair is in opposition and will cancel out. FIG. 8 shows the output signal wavetrains for the ratio $p:p'=½$. Here there is no coincident cyclic data and hence, no data reinforcement.

Figures 9, 11:
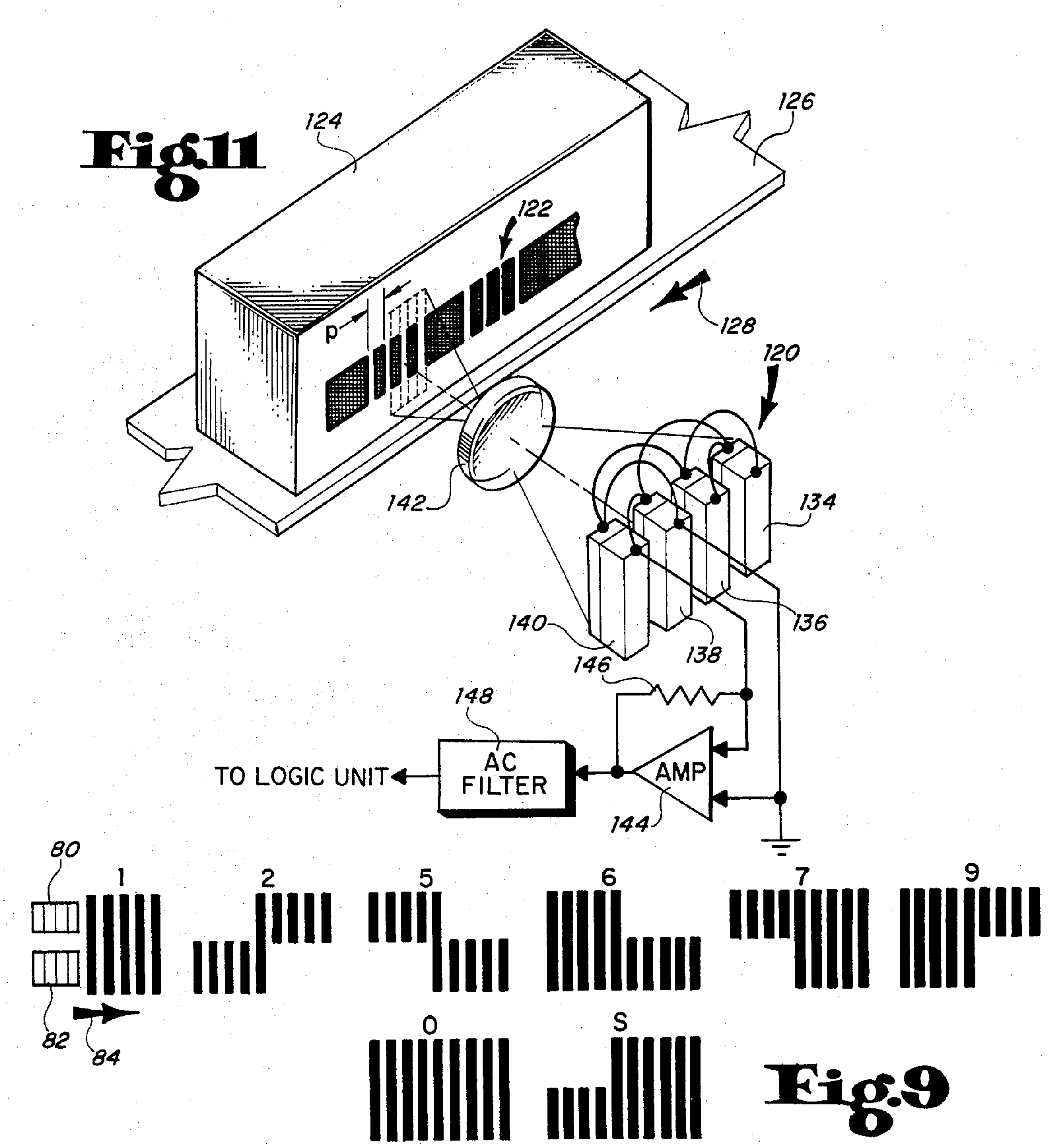
FIG. 9 is one example of a quasi-numerical pitch match coding usefully employed with an inventive embodiment.
FIG. 11 is similar to FIG. 1 but illustrates another method of interconnecting the sensors comprising an array.
Figure 12:
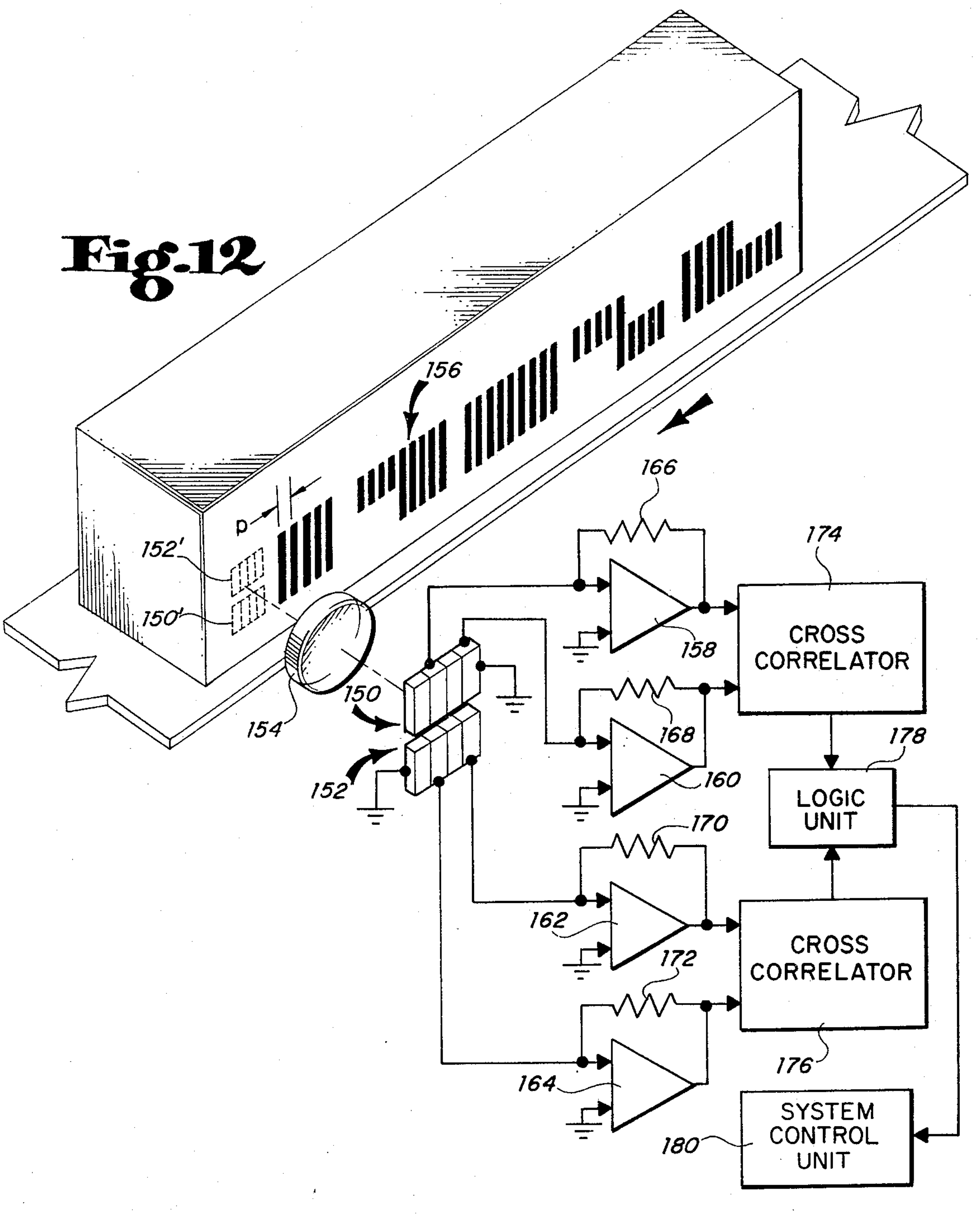
FIG. 12 illustrates a preferred invention embodiment utilized for decoding of quasi-numerical pitch match coded data.

FIG. 9 shows an example of various coded arabic numerals having alternate light and dark stripes to permit pitch-match decoding. As shown there are two separate decoding channels each of which will be read by its own four element sensor array, arrays 80 and 82, respectively, which will be caused to traverse the coded numerals in the direction of arrow 84. As shown, the coding for each channel is binary, there being five cycles for an "0" and 10 for a "1." Then Then, for arabic 1, two output "0"'s in time coincidence = 1, and if time displaced with array 82 leading array 80, two output "0"'s = 2, etc.. Naturally appropriate decoding logic such as is shown and discussed below in conjunction with FIG. 12, is necessary to deduce these results. A particular advantage of this form of coding, is the ability of human operators to read it at relatively high speed whereas some other coding forms are more difficult of human comprehension.

Figure 10:
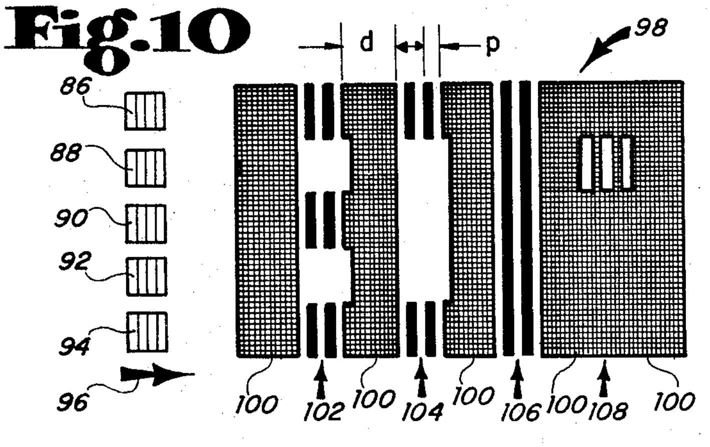
FIG. 10 illustrates a five channel bident coded panel in pitch match coded form.

FIG. 10 illustrates a five channel standard bident coded panel converted to permit pitch-match decoding by the five sensor arrays 86, 88, 90, 92 and 94, working in conjunction with a decoding logic system (not shown but conventional). The five sensor arrays simultaneously traverse the coded panel 98 moving in the direction of arrow 96. As shown, areas 100 are complete blanks and are used to insure that the signals from all sensor elements falls off to zero or an equivalent reference level between each grouping of data. Data grouping 102 corresponds to the letter *y* or numeral 6 depending on which carriage shift has preceeded the grouping; grouping 104 corresponds to *z* or quotation marks; 106 to a letter shift; and 108 to a carriage return command.

Another inventive embodiment is illustrated in FIG. 11. This embodiment is similar to that of FIG. 1 but with different cell interconnections and consequently different signal processing circuitry. Here, sensor array 120 is positioned with respect to a binary coded panel 122 on package 124 which is moved past the array on conveyor 126 moving in the direction of arrow 128. Optical means 142 is utilized to achieve a pitch match in a similar manner to that described above for effecting a pitch match with the FIG. 1 system. As shown, adjacent sensors 134 and 136 comprising a line pair, are electrically connected together in parallel opposition as are sensors 138 and 140 comprising a second line pair. The output signals of the two sensor line pairs are then summed by connecting them in parallel to each other. The summed data are fed into operational amplifier 144 which has associated with it, feedback resistor 146.

After amplification, the output signal wavetrain is as if the wavetrains 3E and 3F had been added together. This signal, after filtering, can then be applied directly to any appropriate logic circuitry (not shown). As can be appreciated, for a known velocity of coded panel 122 and pitch *p* of the stripes in that panel, the design of AC bandpass filter 148 is easily determined; e.g., for a pitch *p* of 0.1 inch and a panel velocity of 100 inches per second, the resultant frequency will be 1,000 cycles per second. This frequency would be utilized as the center frequency of filter 148.

FIG. 12 illustrates a preferred inventive embodiment. Here two sensor arrays 150 and 152, each containing four sensor elements electrically connected to result in two line-pairs, are so positioned as to scan the object plane one above the other. Optical means, illustratively objective lens 154, effects pitch matching of the sensor line-pairs with the pitch *p* of the alternate dark and light stripes comprising the coded data panel 156 which utilizes the quasi-numerical coding of FIG. 9. As will be apparent, the relative phasing of the two sensor arrays to each other is not critical in this embodiment since their respective data outputs are separately cross correlated.

The outputs of the two line pairs comprising sensor array 150 are applied to low drift operational amplifiers 158 and 160 and those from the two line-pairs comprising sensor array 152 to amplifiers 162 and 164, each with its respective feed back resistor 166, 168, 170 and 172, respectively. The outputs of these four amplifiers is passed to cross-correlators 174 and 176. Each of the cross correlators determines the line-pair phase relationships of the two pairs it is connected to and determines the relative amplitude of the signal from each pair to the summed data. Logic unit 178 counts the number of mutually coincident cycle excursions for each sensor array and provides system control unit 180 with a distinctive signal output indicative of the numerical value of each of the coded panel's characters as they move in succession past the two sensor arrays.

Figure 13:
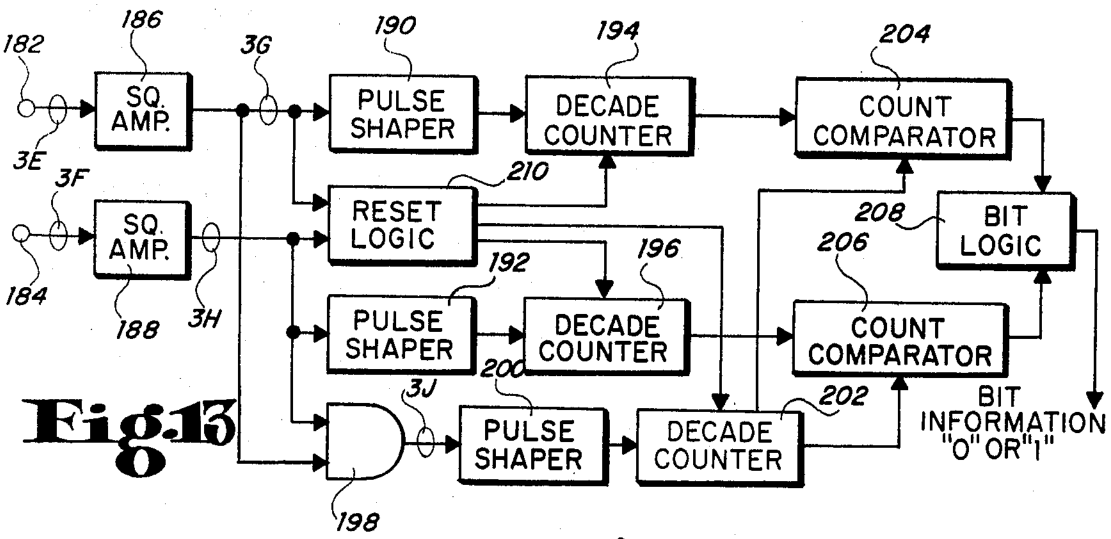
FIG. 13 is an electrical schematic, partially in block-diagram form, of a decoder useful with the sensor array of FIG. 1 and binary coded pitch match coded data.

FIG. 13 illustrates schematically and in block diagram form a decoder usefully employed with the sensor apparatus of FIG. 1. Waveforms present in the FIG. 13 circuitry are graphically presented in FIG. 3 at the correspondingly lettered points. As set forth above, the binary status of a given bit is determined by counting the number of coincident cycles from each sensor line-pair and the data is validated by counting the total number of cycles from each sensor line-pair. If the bit is "0," there there will be four cycles generated in each sensor line-pair of which three will be in time coincidence. If the bit is "1,"there there will be seven cycles generated in each sensor line pair of which six will be in time coincidence.

The differential cell data E and F at the output terminals 116 and 118 in FIG. 1, is applied at the input of the FIG. 13 circuit at terminals 182 and 184. Wavetrain 3E is further amplified and squared in squaring amplifier 186 and wavetrain 3F is similarly processed in squaring amplifier 188. The emergent wavetrains 3G and 3H are further shaped in pulse shapers 190 and 192 and have their cyclic excursions counted by decade counters 194 and 196. Wavetrains 3G and 3H are also compared in "and" gate 198 for time coincidence and those gates generated when 3G and 3H are in time coincidence, form coincidence wavetrain 3J. After shaping in pulse shaper 200, the pulses in wavetrain 3J are counted in decade counter 202. This coincident count is then compared with the total count in count comparators 204 and 206 and the resultant data is fed to Bit Logic 208.

Reset of the three decade counters is accomplished at the end of each grouping of data. Reset is accomplished by reset logic circuit 210. If, as it often is, data panel velocity is approximately known, the reset logic can be quite simple; e.g., a timing circuit which recognizes the interruptions between data groups.

In each of the several embodiments described herein, each of the sensor arrays consisted of four sensors interconnected to form two line-pairs. In applications where target contrast is good, this number can be reduced to a sensor array consisting of two sensors comprising one line-pair. This can be seen by examining the graphical representations of FIG. 3. Consider wavetrains A and E, and B and F. As can be clearly seen, removing the D.C. level from wavetrains A and B would result in signals substantially equal to wavetrains E and F and the data could then be processed in the manner described in conjunction with FIG. 12.

In still other high contrast target applications it is possible to still further reduce the number of sensors in an array. Where ambient rejection is not necessary, it is possible to use a single sensor whose width is pitch-matched to $p/2$. Such a configuration is shown in FIGS. 14 and 16 and in the wavetrain diagram of FIG. 15 showing showing the amplified sensed wavetrain present in the FIG. 14 circuit.

Figure 14:
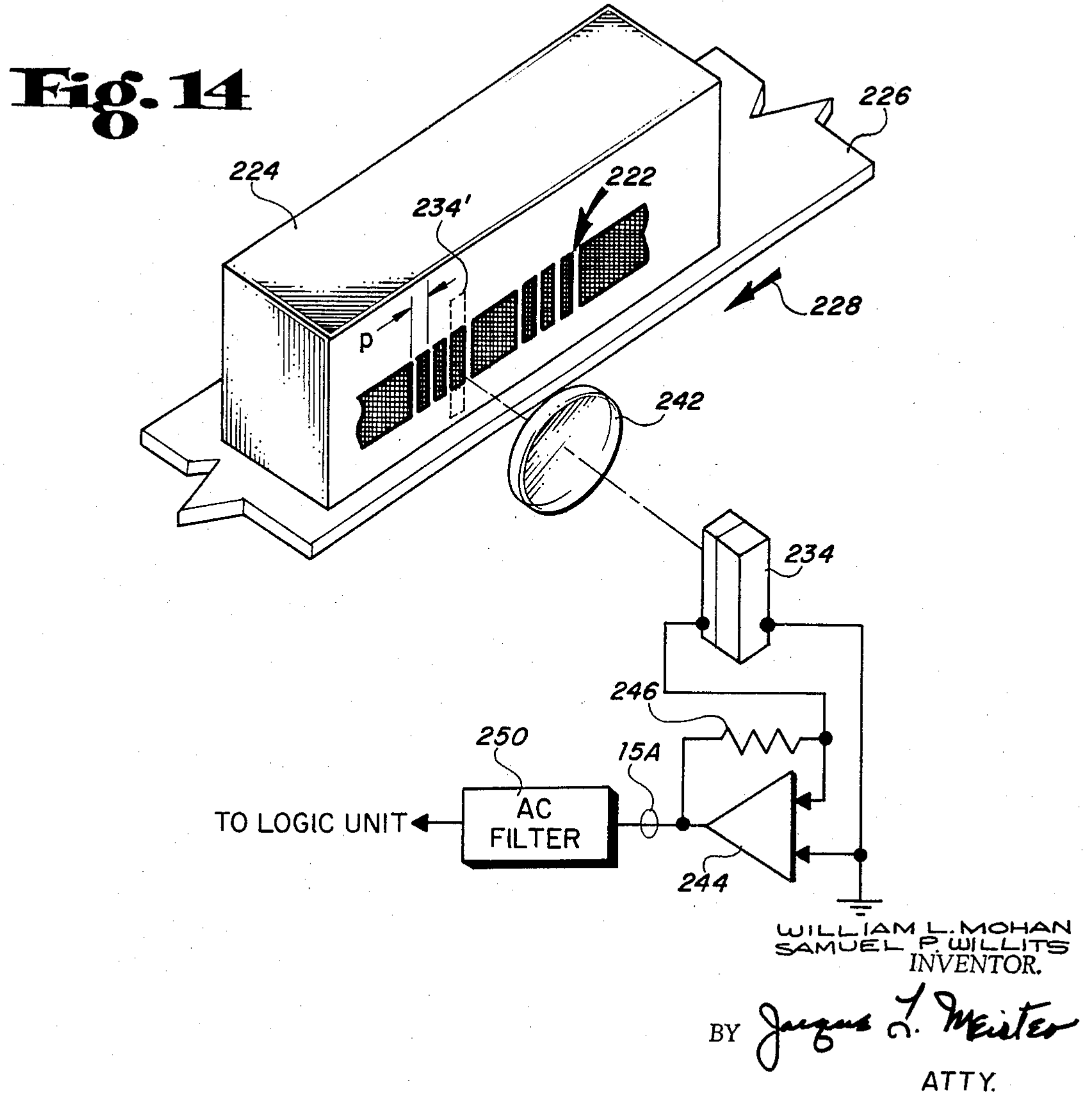
FIG. 14 is similar to FIG. 11 but illustrates use of a single sensor in the sensing array.

FIG. 14 is similar to FIG. 11 but has but one sensor 234 in its sensor array. Sensor 234 is positioned with respect to binary coded panel 222 on package 224 which is moved past the array on conveyor 226 in the direction of arrow 228. Optical means 242 are utilized to achieve a pitch-match in the manner described above. As shown, sensor 234 is pitch-matched to $p/2$, the image of the sensor being designated by its respective reference numeral together with a prime (') designation superimposed on the bars of coded panel 222. The output data of sensor 234 is fed to operational amplifier 244 which has associated therewith feedback resistor 246. The output wavetrains of amplifier 244 is shown in FIG. 15 at A. For a very high contrast coded panels, this output signal, other than D.C. level, is substantially the same as that present at the output of amplifier 144 of the FIG. 11 embodiment and can be similarly processed.

Figures 15, 16:
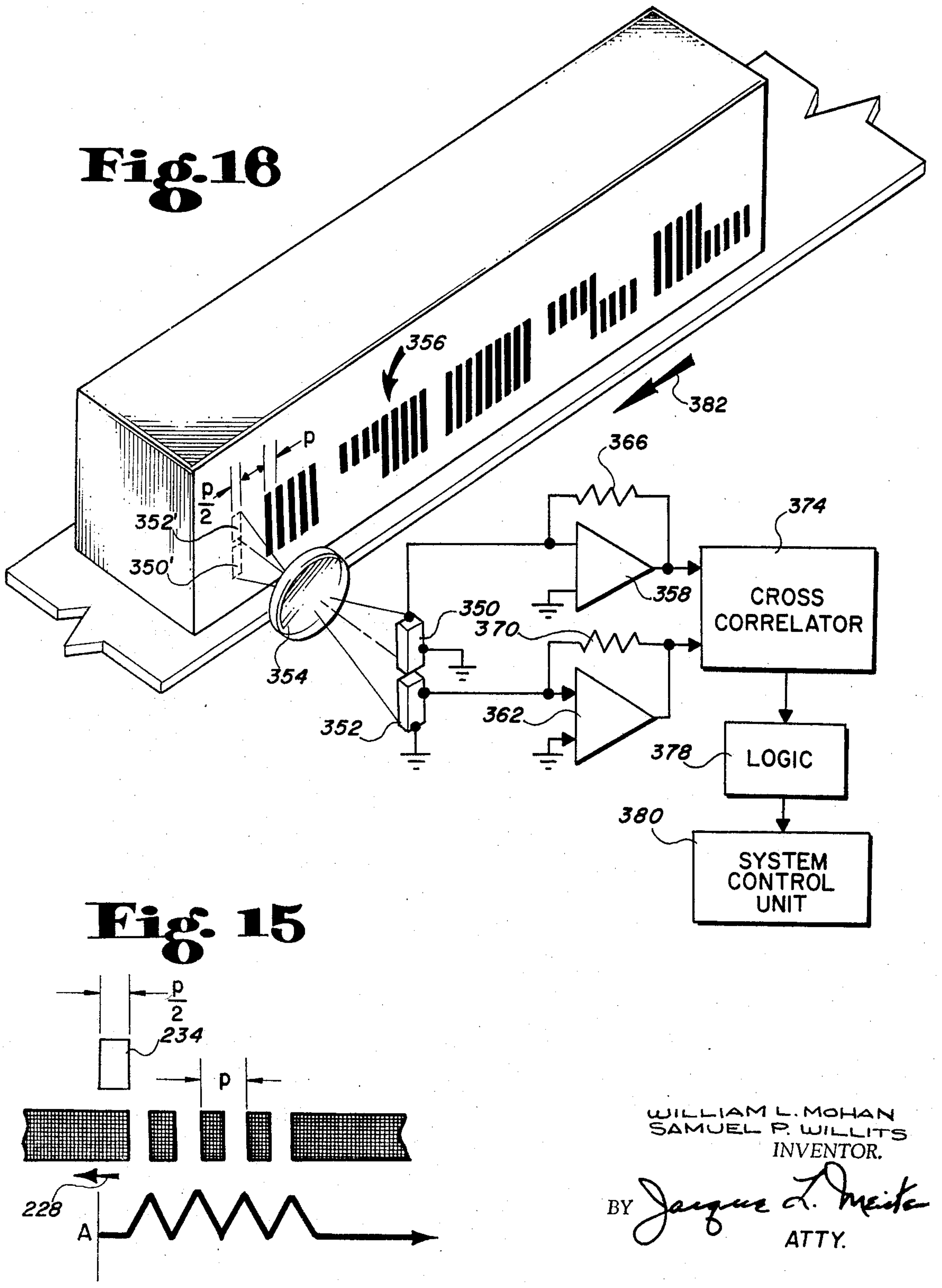
FIG. 15 illustrates the waveform generated by the sensor array of FIG. 14, after amplification, when scanning a binary coded data panel.
FIG. 16 is similar to FIG. 12 but illustrates use of single sensors in the sensing array for each channel.

FIG. 16 illustrates another of the simplified devices possible with very high contrast targets. The FIG. 17 embodiment is similar in several respects to that of FIG. 12. However, each of the sensor arrays 350 and 352 consists of but one sensor whereas those of FIG. 12 each have four sensors. Pitch matching is effected by optical means, illustratively objective lens 354, to image the sensor at an effective width of $p/2$. The outputs of the two sensor arrays 350 and 352 are applied to operational amplifiers 358 and 362, respectively, each of which has a feedback resistor, 366 and 370, respectively. The output of these two amplifiers is passed to cross-correlator 374 which determines the sensor - phase relationships of the two sensor arrays. As in the FIG. 12 embodiment, logic unit 378 counts cycle excursions to provide system control unit 380 with a signal indicative of the numerical value of each of the coded panels.

No means have been shown for illuminating the coded panels. In some application such illumination is not necessary whereas in others, illumination may be necessary to ensure an adequate response. Also not shown are the frames for supporting the sensor arrays of each of the embodiments relative to the coded data panel and to the pitch matching devices ordinarily used. Such frames not being a part of the invention, are not described herein, it being understood that they may be of any suitable construction for maintaining the required relationships.

It should be understood that the foregoing description is merely illustrative of the invention. Although satisfactory results have been realized when using each of the various invention embodiments described, various modifications of the invention could be devised by one skilled in the art to achieve similarly satisfactory results without departing from the invention. However, such modifications would clearly fall within the scope of the invention as set forth in the accompanying claims.

What is claimed is:

1. Apparatus for counting alternating stripes in a coded panel to effect decoding of information contained in said panel, comprising at least one pair of sensor means comprising a sensor array, the electrical output of each of said sensor means of a pair being electrically connected in parallel opposition with the other sensor means of said pair, the effective width of each of said sensor means being substantially equal to each other and to the width of a stripe in said coded panel, the effective sensor area of each of said sensors of said pair being positioned adjacent one another in the direction of progression of said alternating stripes, each of said pairs of sensor means comprising a sensor line pair;

frame means supporting and connected to said sensor array for enabling relative movement between said sensor array and said coded panel while enabling orientation of the width axis of said sensor means substantially parallel to the thickness axis of each of said stripes to thereby generate output signals from each sensor means indicative of the number of said stripes, and signal amplifying and processing circuit means connected to said sensor array for combining the output signals of each sensor of a sensor line pair to provide an output wavetrain having a total quantity of cycles equal to the total quantity of pairs of stripes in said coded panel.

2. Counting apparatus in accord with claim 1 further comprising pitch matching means for adjusting the effective width of said sensor means to that of said alternating stripes.

3. Apparatus for counting alternating stripes in a coded panel, comprising at least one pair of sensor means comprising a sensor array, the electrical output of each of said sensor means of a pair being electrically connected in parallel opposition with the other sensor means of said pair, the effective width of each of said sensor means being substantially equal to each other, the effective sensor area of each of said sensors of said pair being positioned adjacent one another in the direction of progression of said alternating stripes, each of said pairs of sensor means comprising a sensor line pair pitch matching means interposed between said sensor array and said striped coded panel, said pitch matching means being adapted to enable the adjustment of the effective width of each of said sensor means to equal the width of each of said stripes, frame means supporting and connected to said sensor array for enabling relative movement between said sensor array and said coded panel while enabling orientation of the width axis of said sensor means substantially parallel to the thickness axis of each of said stripes to thereby generate output signals from each sensor means indicative of the number of said stripes, and signal amplifying and processing circuit means connected to said sensor array for combining the output signals of each sensor of a sensor line pair to provide an output wavetrain having a total quantity of cycles equal to the total quantity of pairs of stripes in said coded panel.

4. Apparatus for counting alternating stripes in a coded panel to effect decoding of information contained in said panel, comprising a sensor array comprising at least two pairs of sensor means, each of said sensor means being substantially equal in width to each other and to the width of said stripes in said coded panel, each of said pairs of sensor means comprising a sensor line pair, frame means supporting and connected to said sensor array for enabling relative movement between said sensor array and said coded panel to thereby generate output signals from each sensor means indicative of the number of said stripes, signal amplifying and processing circuit means connected to said sensor array for combining the output signals of each sensor of a sensor line pair to provide an output wavetrain having a total quantity of cycles equal to the total quantity of pairs of stripes in said coded panel, and logic means connected to said signal amplifying and processing circuit means and adapted to count the total number of cycles in said output wavetrain of each of said sensor line pairs and to compare said total with the number of cycles in each of said output wavetrains that are in phase coincidence to thereby determine the coded data.

5. Counting apparatus in accord with claim 4 wherein said logic means comprises individual pulse shaping and counting means connected to each of said signal amplifying and processing circuit means for counting the cyclic excursions in the output thereof, coincidence circuit and counting means connected to the outputs of all of said signal amplifying and processing circuit means for counting the number of cyclic excursions in the output of the latter means that are in time coincidence, individual count comparison means connected to the output of each of said pulse shaping and circuit means and to the output of said coincidence circuit and counting means for comparing the outputs thereof, and logic circuit means connected to the output of said count comparison means and adapted to generate serial output information signals indicative of the binary state of serial elements of said coded panel.

6. Counting apparatus in accord with claim 4 further comprising pitch match adjusting means interposed between said sensor array and said coded panel for effecting adjustments of the effective width of each of said sensor means to be substantially equal to that of said stripes.

7. Counting apparatus in accord with claim 4 wherein said paired sensors of each sensor line pair are electrically connected together in parallel opposition and the outputs of all sensor line pairs are summed by being electrically connected in parallel to each other.

8. Counting apparatus in accord with claim 7 further comprising band pass means connected at the input to said signal amplifying and processing circuit means and at its output to said logic means, said filter means having a center frequency related to the velocity of said relative movement and to the said width of said stripes in said coded panel.

9. Apparatus for decoding plural parallel coded channels each of which consists of alternating contrast stripes of equal width interspersed at selected intervals by blank areas to separate coded data elements, comprising a sensor array means for each coded data channel, each of said sensor array means comprising at least one sensor means, the sensor means in each array being substantially equal in width to that of said stripes in its associated coded data channel, frame means supporting and connected to said sensor array means for enabling relative movement between said sensor array means and said plural parallel coded data channels to thereby generate cyclic output signals from each sensor means indicative of said stripes and said blank areas, signal amplifying and processing circuit means connected to said sensor array for each of said sensor arrays adapted to provide an output wavetrain having a number of cycles related to the total quantity of pairs of stripes in its associated coded data channel, and decoding means connected to each of said signal amplifying and processing circuits and adapted to count the total number of cycles in each channel and the number and relative time displacement of mutually coincident cycles to thereby effect decoding of the plural parallel coded data.

10. Decoding apparatus in accord with claim 9 wherein each of said sensor array means comprises at least one pair of sensor means, each of said pairs of sensor means defining a sensor line pair, and said signal amplifying and processing circuit means comprises individual ones of such circuits for each sensor line pair.

11. Decoding apparatus in accord with claim 9 wherein said decoding means comprises cross correlation means for each sensor array means, said cross-correlator means each being connected at their input to said signal amplifying and processing circuit means for its associated sensor array and adapted to determine the phase relationships between the cyclic data for sensor line pairs comprising said associated sensor array and to pass as an output only those cycles that are in phase, and logic means connected to all of said cross-correlator means, said logic means being adapted to count the number of mutually coincident cycle excursions for each sensor array and provide at its output signals indicative of separate characters in said coded panel.

* * * * *

UNITED STATES PATENT OFFICE
CERTIFICATE OF CORRECTION

Patent No. 3,663,803 Dated May 16, 1972

Inventor(s) WILLIAM L. MOHAN, SAMUEL P. WILLITS

It is certified that error appears in the above-identified patent and that said Letters Patent are hereby corrected as shown below:

Column 1, line 34, "end" should be --"tend"--

Column 2, line 26, "vided" should be --"vides"--

Column 4, line 64, delete "Then" [first occurence]

Column 6, line 58, "Fig. 17" should be --"Fig. 16"--

Signed and sealed this 8th day of May 1973.

(SEAL)
Attest:

EDWARD M. FLETCHER, JR.
Attesting Officer

ROBERT GOTTSCHALK
Commissioner of Patents